US005117556A

United States Patent [19]

Schaefer

[11] Patent Number: 5,117,556

[45] Date of Patent: Jun. 2, 1992

[54] METHOD FOR ENGINE BLOCK HEATER INSTALLATION

[75] Inventor: Ron Schaefer, Winnipeg, Canada

[73] Assignee: Budd Canada Inc., Winnipeg, Canada

[21] Appl. No.: 626,191

[22] Filed: Dec. 12, 1990

[30] Foreign Application Priority Data

Dec. 14, 1988 [CA] Canada .................................. 585890

[51] Int. Cl.[5] .............................................. B23P 19/04

[52] U.S. Cl. .................................... 29/888.01; 29/445

[58] Field of Search ................ 219/208, 523; 392/455, 392/501; 29/888.01, 890.03, 445, 462, 726; 123/41.09, 41.51, 142.5 E

[56] References Cited

U.S. PATENT DOCUMENTS

| | | | |
|---|---|---|---|
| 2,274,445 | 5/1940 | Greer | 219/523 |
| 2,544,458 | 12/1948 | Higgins | 392/455 |
| 4,286,139 | 8/1981 | Taylor | 219/208 |
| 4,634,834 | 1/1987 | Lupoli et al. | 219/208 |
| 4,851,640 | 7/1989 | Smith | 219/208 |

FOREIGN PATENT DOCUMENTS

| | | | |
|---|---|---|---|
| 250632 | 6/1925 | Canada . | |
| 250640 | 12/1926 | Canada . | |
| 700836 | 12/1964 | Canada | 219/208 |
| 717626 | 9/1965 | Canada . | |
| 717627 | 9/1965 | Canada . | |
| 870788 | 5/1971 | Canada | 219/208 |

OTHER PUBLICATIONS

1988 Zero Start Catalog.

*Primary Examiner*—P. W. Echols
*Assistant Examiner*—Peter Dungba Vo
*Attorney, Agent, or Firm*—Harness, Dickey & Pierce

[57] ABSTRACT

A method of installing an engine block heater includes the provision of an O-ring carried by the cylindrical body of the heater. The heater also includes a flange portion with a passage therein. The engine block wall is provided with a threaded opening located adjacent to the typically found aperture in the engine block. The heater can be easily installed by aligning the passage in the heater flange with the opening in the engine block and then inserting the body into the aperture such that the O-ring seal engages the aperture wall to provide a sealing engagement therebetween. The heater can be secured by way of a fastener passing through the flange passage which is threaded into the engine block opening.

6 Claims, 1 Drawing Sheet

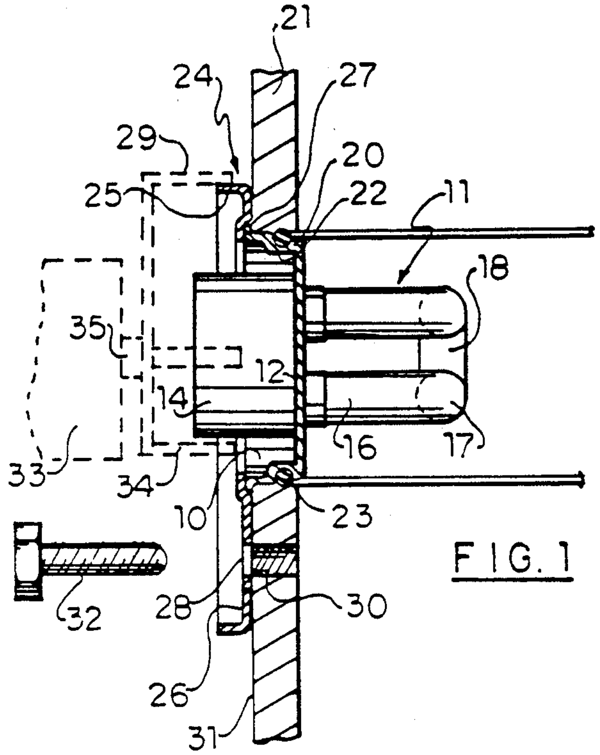
FIG. 1
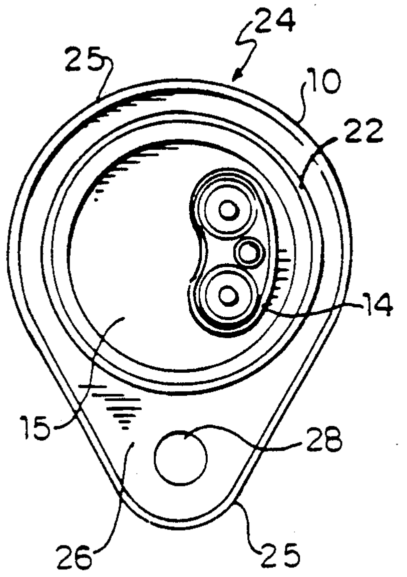
FIG. 2
FIG. 3
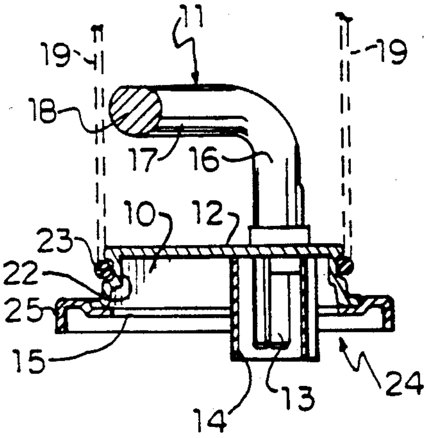
FIG. 4
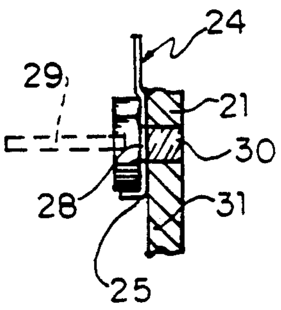

METHOD FOR ENGINE BLOCK HEATER INSTALLATION

This is a division of U.S. patent application Ser. No. 07/397,112, filed Aug. 22, 1989, now U.S. Pat. No. 5,021,633.

BACKGROUND OF THE INVENTION

This invention relates to new and useful improvements in the construction of block heaters for the engine blocks of any liquid cooled engine, said construction permitting the installation to be accomplished either manually or, preferably, robotically.

Conventional block heaters are normally installed manually by engaging the body portion thereof into an aperture formed in the wall of the cylinder block and then manipulating screw threaded means to extend arms or projections either to engage the inner surface of the wall around the aperture and thereby pull the heater into engagement or by engaging projections into the wall of the aperture. These actions are difficult if not impossible to accomplish economically by robotic means.

The present invention overcomes these disadvantages by providing a heater having an o-ring seal around the body portion and which is pushed into engagement through the aperture in the wall whereupon a bolt engages through the outer flange of the heater and into the wall and is provided only to prevent outward movement of the heater once installed. This enables the heater to be installed manually as in retrofitting or, preferably, robotically during the initial engine assembly.

In accordance with the invention there is provided an engine block heater for automobile engines and the like, adapted to be engaged within a cylindrical aperture in the engine block and comprising in combination a substantially cylindrical body portion, and an electrical heating element extending from one side thereof, electrical connector means on the other side thereof operatively connected to said heating element and a surrounding flange plate extending radially from adjacent said other side of said body portion having an outer diameter greater than the cylindrical body portion and the cylindrical opening in the associated engine block. Sealing means around said body portion and an aperture through said flange plate outboard of said cylindrical body portion for the location and the eventual fastening of said heater to the associated engine block after insertion of said body portion within said cylindrical aperture in said engine block.

Another aspect of the invention is to provide a method of robotically installing an engine heater into an apertured cylinder block wall of a fluid cooled engine consisting of the steps of:

(a) aligning the body portion of said heater with the aperture within said cylinder block;

(b) engaging a probe within the aperture within said flange rim;

(c) aligning said probe and said aperture within said ring with the screw threaded aperture within said cylinder block;

(d) withdrawing said probe;

(e) engaging a screw threaded bolt through said aperture within said ring and screw threadably engaging same within said screw threaded aperture in said block to secure said heater within the aperture in said block.

Another advantage of the invention is to simplify the construction of conventional engine heaters by eliminating all of the moving parts normally required for detachably securing an engine heater in position.

A still further advantage of the invention is to provide a device of the character herewithin described which is simple in construction and installation, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of the heater shown installed within an aperture in the wall of the associated engine block and partially sectioned for clarity.

FIG. 2 is an outer side elevation of the heater per se.

FIG. 3 is a view of the heater of FIG. 1 but rotated through 90°.

FIG. 4 is a fragmentary partially schematic view showing the probe for aligning the heater attaching aperture with the securing aperture in the block.

In the drawings like characters of reference indicate corresponding parts in the different figures.

DETAILED DESCRIPTION

Proceeding therefore to describe the invention in detail, reference character 10 shows a cylindrical body portion or block having a heater element collectively designated 11 extending from the inner end 12 thereof operatively connected through the block to terminals 13 contained within shroud 14 on the other or outer side 15 of the block or body portion.

The element is conventional in construction and includes the two leg portions 16 which extend perpendicularly from the inner end 12 of the body portion and then are angulated at approximately 90° to form portions 17 which are joined by crossbar portion 1B all of which is conventional. However, it should be appreciated that the angulated portions 17 and crossbar portion 18 are confined within the projected diameter of the body portion identified in FIG. 3 by the dotted lines 19 thus permitting the heater to be installed within an aperture 20 formed in the cylinder block wall 21 by moving the block heater perpendicular to the plane of the engine block wall. This avoids any manipulation requirements in order to engage the element through the aperture 20 in contrast to most of the existing block heaters which have to be hooked through the aperture in order to engage the body portion within the wall, and action that is difficult if not impossible to accomplish robotically.

The body portion includes a surrounding annular groove 22 into which is seated an o-ring 23 which engages the wall of the aperture 20 when inserted thus providing an adequate seal which will withstand the normal pressure of the fluid (not illustrated) circulating within the engine block under normal running conditions.

A retaining ring is provided collectively designated 24 which is substantially circular when viewed in plan and which has an outer flanged lip 25 formed around the periphery thereof for stiffening purposes and an offstanding ear portion 26 is formed on one side of the retainer ring as clearly shown in FIG. 2 and is also flanged as at 25. This retainer ring may be welded to the front side of the body portion 11 as indicated by reference character 27, either continuously or spot-welded as desired. This of course is accomplished during the manufacture of the heater element assembly.

The aforementioned ear portion 26 is apertured as a 28, said aperture having two functions. Firstly, it permits a probe 29 to be engaged through the aperture robotically once the element has been aligned with the aperture 20 within the cylinder block. Jaws 34 shown schematically and in phantom in FIG. 1, may form part of the robotic machinery which is conventional in operation thus permitting the body to be rotated axially relative to the aperture 20 until the probe engages a screw threaded attaching aperture 30 formed through the wall of the block to one side of the aperture 20. Once the correct radial location has been ascertained, the jaws may then move endwise and insert the heater body into the aperture 20 with the o-ring 23 sliding along the wall of the aperture 20 until the flange engages the outer face 31 of the cylinder block wall. At this point, the probe is withdrawn and a screw-threaded bolt 32 is inserted robotically and screw-threadably engaged within the screw-threaded aperture 30 thus holding the heater firmly in position against the face 31 of the engine block wall with the o-ring 23 providing the necessary seal.

The bolt 32, correctly tightened, resists any outward movement of the heater element due to vibration or fluid pressure particularly during the operation of the engine.

Reference character 33 shows in phantom and schematically, one portion of the robotic installer which includes jaws 34 to hold the heater and to rotate same with the probe 29 in position, rotating around the axis pivot 35 also shown schematically.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of installing an engine block heater into an aperture of an engine block of a fluid cooled engine, said engine block heater having a body portion having a flange portion extending therefrom with a passage provided therein, comprising the steps of:

(a) aligning the body portion of said heater with the aperture within said block;

(b) aligning the passage within a flange portion of said heater with a screw threaded opening within said block;

(c) inserting said heater body portion into said aperture in the block;

(d) placing a fastener through said passage and into said screw threaded opening in said block; and (e) rotating said fastener into said screw threaded opening, thereby securing said heater within the aperture in said block.

2. The method as defined by claim 1, wherein said step of aligning said passage comprises the steps of:

(a) inserting a probe through said passage;

(b) aligning said probe with said screw threaded opening within said block and;

(c) withdrawing said probe.

3. The method as defined by claim 1 wherein at least steps a–c are carried out by an automated robot.

4. The method as defined by claim 3 wherein steps d and e are carried out by an automated robot.

5. A method of installing an engine block heater into an engine block having a cylindrical aperture defined by an inner wall extending substantially transversely to a face of the engine block, said method comprising:

providing the engine block heater with a substantially cylindrical body portion having an electrical heating element extending from one side thereof, said body portion having a flange plate extending radially therefrom with a passage therein;

placing a seal on outer walls of the cylindrical body of the engine block heater;

forming a threaded opening in the engine block adjacent to the aperture therein;

aligning the passage in the flange of the engine block heater with the opening in the engine block;

moving the heater towards the face of the engine block until the heater is inserted into the aperture while maintaining alignment between the passage and the opening, with said seal engaging the inner wall of the aperture to provide a sealing engagement therebetween; and using a fastener passing through the passage in the flange and the opening in the engine block to secure the heater to the engine block.

6. The method of claim 5 wherein said seal is an O-ring, and wherein the heater is installed automatically by a robot.

* * * * *

UNITED STATES PATENT AND TRADEMARK OFFICE
CERTIFICATE OF CORRECTION

PATENT NO. : 5,117,556

DATED : June 2, 1992

INVENTOR(S) : Ron Schaefer

It is certified that error appears in the above-identified patent and that said Letters Patent is hereby corrected as shown below:

On the title page, below item [22] Filed: insert the following:
Related U.S. Application Data
--[62] Division of application No. 07/397,112, Aug. 22, 1989.--.

In column 1, line 1, insert the following:
--This application is a divisional of U.S. application no. 07/397,112, filed Aug. 22, 1989.--.

Col. 3, line 12, "a" should be -- at --.

Col. 4, line 19, "and;" should be -- ; and --.

Signed and Sealed this

Fourth Day of July, 2000

Attest:

Q. TODD DICKINSON

Attesting Officer

Director of Patents and Trademarks